United States Patent [19]
Miyashita et al.

[11] Patent Number: 5,501,073
[45] Date of Patent: Mar. 26, 1996

[54] IGNITION TIMING CONTROL SYSTEM FOR INTERNAL COMBUSTION ENGINES

[75] Inventors: Yukio Miyashita; Yuichi Shimasaki; Toshikazu Oketani; Seiji Hatcho; Seiji Matsumoto; Takuya Aoki; Akihisa Saito; Takashi Komatsuda; Hiroaki Kato, all of Wako, Japan

[73] Assignee: Honda Giken Kogyo Kabushiki Kaisha, Tokyo, Japan

[21] Appl. No.: 305,278

[22] Filed: Sep. 13, 1994

[30] Foreign Application Priority Data

Sep. 13, 1993 [JP] Japan .................. 5-251099

[51] Int. Cl.$^6$ ......................................... F01N 3/28
[52] U.S. Cl. .............. 60/284; 60/285; 60/297; 60/300
[58] Field of Search .............. 60/274, 285, 284, 60/300, 297

[56] References Cited

U.S. PATENT DOCUMENTS 5,201,173  4/1993  Fujimoto ................... 60/277
5,263,318  11/1993  Oota ........................ 60/284
5,379,586  1/1995  Honji ....................... 60/289
5,388,405  2/1995  Fujishita ................... 60/297

FOREIGN PATENT DOCUMENTS

61-205377  9/1986  Japan .
61-205376  9/1986  Japan .
4-105925  9/1992  Japan .

*Primary Examiner*—Douglas Hart
*Attorney, Agent, or Firm*—Nikaido, Marmelstein, Murray & Oram

[57] ABSTRACT

An internal combustion engine has an adsorber arranged in the exhaust passage for adsorbing unburnt components in exhaust gases, and an exhaust gas-purifying device arranged in the exhaust passage at a location downstream of the adsorber. The exhaust gas-purifying device is equipped with a heater. An ignition timing of an internal combustion engine is retarded when the engine is started at a low engine temperature. The retardation of the ignition timing is restrained over a time period from the start of the engine to a time point the exhaust gas-purifying device is warmed up to a predetermined activated condition.

14 Claims, 11 Drawing Sheets

| TW ↑ | | | | |
|---|---|---|---|---|
| TW4 — NTC14 | NTC24 | NTC34 | NTC44 |
| TW3 — NTC13 | NTC23 | NTC33 | NTC43 |
| TW2 — NTC12 | NTC22 | NTC32 | NTC42 |
| TW1 — NTC11 | NTC21 | NTC31 | NTC41 |
| TW0 — TA0 | TA1 | TA2 | TA3 | TA4 → TA |

FIG.4

| PBA ↑ | | | | |
|---|---|---|---|---|
| PBA4 — NTCB14 | NTCB24 | NTCB34 | NTCB44 |
| PBA3 — NTCB13 | NTCB23 | NTCB33 | NTCB43 |
| PBA2 — NTCB12 | NTCB22 | NTCB32 | NTCB42 |
| PBA1 — NTCB11 | NTCB21 | NTCB31 | NTCB41 |
| PBA0 — NE0 | NE1 | NE2 | NE3 | NE4 → NE |

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to an ignition timing control system for an internal combustion engine having an adsorber for adsorbing unburnt gas and an exhaust gas-purifying device equipped with a heater, which are arranged in series in an exhaust passage of the engine.

2. Prior Art

Conventionally, a technique has been proposed by the present assignee e.g. by Japanese Provisional Patent Publications (Kokai) Nos. 61-205376 and 61-205377, in which under a predetermined operating condition of an internal combustion engine immediately after the start of the engine, ignition timing is retarded relative to an ordinary ignition timing to elevate exhaust gas temperature, thereby promptly warming up a catalytic converter (three-way catalyst) arranged in an exhaust passage of the engine to activate the same.

Further, in order to control emission of unburnt components (HC (hydrocarbon), etc.) into the atmosphere when an internal combustion engine is started in a cold state, it has been proposed, e.g. by Japanese Provisional Utility Model Publication (Kokai) No. 4-105925, to provide an adsorber for adsorbing unburnt components contained in exhaust gases, and a catalytic converter equipped with a heater (hereinafter referred to as "the heater-equipped catalyst"), which are arranged in an exhaust system of the engine.

The adsorber has a characteristic that it releases unburnt components adsorbed therein at a temperature higher than a predetermined temperature (approximately 200° C.). Therefore, if a three-way catalyst (main catalytic converter) is arranged downstream of the adsorber and the heater-equipped catalytic converter, it is required to warm up the heater-equipped catalyst within a short time, so as to prevent activation of the heater-equipped catalyst or the main catalytic converter from being delayed to a time later than the time of release of unburnt components from the adsorber.

One way to meet this requirement would be to start ignition timing retardation at the start of the engine to elevate the exhaust gas temperature to a higher level, whereby it is possible to accelerate activation of the heater-equipped catalyst. On the other hand, the adsorber is originally intended to temporarily adsorb unburnt components when the heater-equipped catalyst or the main catalytic converter has not been activated, and release adsorbed unburnt components therefrom when the main catalytic converter has become activated, to thereby allow most of the unburnt components to be purified by the heater-equipped catalyst and the main catalytic converter.

If the ignition timing retardation is started simultaneously with the start of the engine to promptly warm up the heater-equipped catalyst and the main catalytic converter, the temperature of the adsorber arranged upstream of them is also elevated promptly, so that the temperature of the adsorber becomes higher than the predetermined temperature (approximately 200° C.) to release unburnt components adsorbed therein before the heater-equipped catalyst and the main catalytic converter become activated. As a result, the unburnt components are undesirably emitted into the atmosphere without being purified by the heater-equipped catalyst and the main catalytic converter. In short, to control the emission of unburnt components into the atmosphere, it is necessary to prevent unburnt components from being released from the adsorber before the heater-equipped catalyst and the main catalytic converter become activated.

Further, if a countermeasure is taken simply by reducing an amount of ignition timing retardation or by inhibiting the ignition timing retardation per se, it takes a longer time period to activate the catalysts, which would then require an increased electrical capacity of the heater-equipped catalyst or a longer time period for energization of the heater to accelerate activation of the catalysts, resulting in a new problem of an increased consumption of electric power.

SUMMARY OF THE INVENTION

It is the object of the invention to provide an ignition timing control system for an internal combustion engine, which is capable of preventing an excessive temperature elevation of an adsorber arranged in an exhaust passage of the engine to thereby minimize degradation of exhaust emission characteristics of the engine, while curtailing electric power consumption by the heater to the minimum.

To attain the above object, the present invention provides an ignition timing control system for an internal combustion engine having an exhaust passage, an adsorber arranged in the exhaust passage for adsorbing unburnt components in exhaust gases, and an exhaust gas-purifying device arranged in the exhaust passage at a location downstream of the adsorber, the exhaust gas-purifying device having heater means.

The ignition timing control system according to the invention is characterized by comprising:

ignition timing-retarding means for retarding ignition timing of the engine when the engine is started in a cold state; and ignition timing retardation-restraining means for restraining retardation of the ignition timing by the ignition timing-retarding means over a time period from the start of the engine to a time point the exhaust gas-purifying device is warmed up to a predetermined activated condition.

Preferably, the ignition timing retardation-restraining means inhibits the retardation of the ignition timing by the ignition timing-retarding means, over the time period from the start of the engine to the time point the exhaust gas-purifying device is warmed up to the predetermined activated condition.

Alternatively, the ignition timing retardation-restraining means restricts an ignition timing-retarding amount by which the ignition timing-retarding means retards the ignition timing, over the time period from the start of the engine to the time point the exhaust gas-purifying device is warmed up to the predetermined activated condition.

More preferably, the ignition timing control system includes temperature-detecting means for detecting a temperature of the exhaust gas-purifying device, and wherein the predetermined activated condition is determined based on results of detection by the temperature-detecting means.

Further preferably, the ignition timing-retarding amount is determined based on the temperature of the exhaust gas-purifying device detected by the temperature-detecting means.

More preferably, the ignition timing control system includes operating condition-detecting means for detecting operating conditions of the engine, and wherein the predetermined activated condition is determined based on results of detection by the operating condition-detecting means.

Preferably, the time period from the start of the engine to the time point the exhaust gas-purifying device is warmed up to the predetermined activated condition is determined depending on an operative state of the heater means.

Further preferably, the ignition timing control system includes operating condition-detecting means for detecting operating conditions of the engine, and wherein the predetermined activated condition is determined based on results of detection by the operating condition-detecting means and depending on an operative state of the heater means.

More specifically, when the engine is in a starting mode, the ignition timing retardation-restraining means calculates the time period from the start of the engine to the time point the exhaust gas-purifying device is warmed up to the predetermined activated condition, based on the operating conditions of the engine detected by the operating condition-detecting means, and thereafter, calculates a sum of a first time period corresponding to a degree of contribution of heat of the exhaust gases to elevation of a temperature of the exhaust gas-purifying means and a second time period corresponding to a degree of contribution of heat generated by heater means to the elevation of the temperature of the exhaust gas-purifying means, to determine that the exhaust gas-purifying device is in the predetermined activated condition when the sum of the first time period and the second time period exceeds the time period from the start of the engine to the time point the exhaust gas-purifying device is warmed up to the predetermined activated condition calculated based on the operating conditions of the engine detected by the operating condition-detecting means.

The above and other objects, features and advantages of the invention will become more apparent from the ensuing detailed description taken in conjunction with the accompanying drawings.

DETAILED DESCRIPTION

Next, the invention will be described in detail with reference to the drawings showing embodiments thereof.

Figure 1:
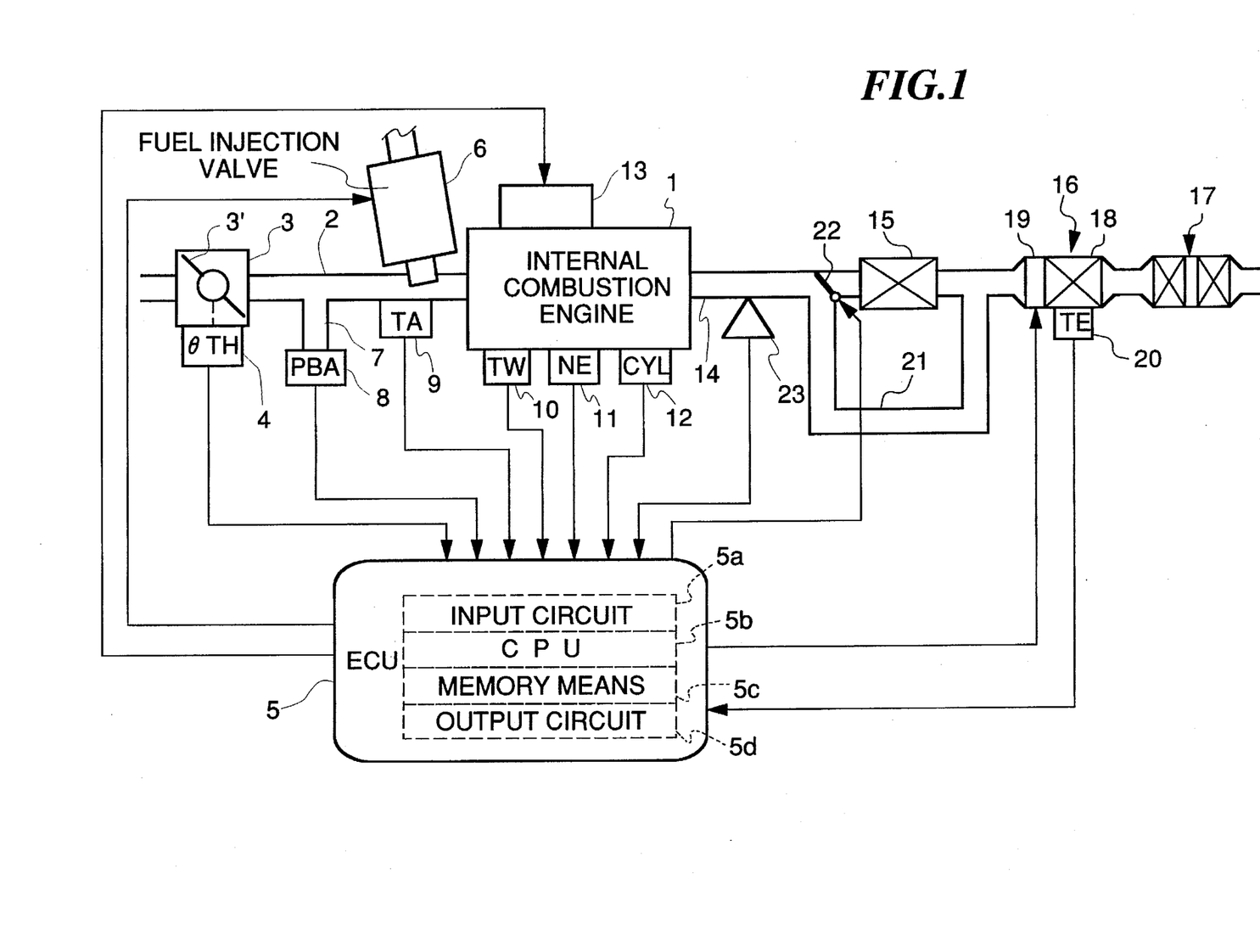
FIG. 1 is a block diagram showing the whole arrangement of an internal combustion engine and an ignition timing control system therefor, which are common to first to third embodiments of the invention.

Referring first to FIG. 1, there is shown the whole arrangement of an internal combustion engine and an ignition timing control system therefor, according to an embodiment of the invention.

In the figure, reference numeral 1 designates a DOHC straight type four cylinder engine (hereinafter referred to as "the engine"), which has a pair of intake valves and a pair of exhaust valves, not shown, provided for each cylinder. In an intake pipe 2 of the engine, there is arranged a throttle body 3 accommodating a throttle valve 3' therein. A throttle valve opening (θTH) sensor 4 is connected to the throttle valve 3' for generating an electric signal indicative of the sensed throttle valve opening and supplying same to an electronic control unit (hereinafter referred to as the ECU") 5.

Fuel injection valves 6 are each provided for respective cylinders and arranged in the intake pipe 2 between the engine 1 and the throttle valve 3', and at a location slightly upstream of the intake valves. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 through a branch conduit 7 at a location immediately downstream of the throttle valve 3', for sensing absolute pressure (PBA) within the intake pipe 2, and is electrically connected to the ECU 5 for supplying an electric signal indicative of the sensed absolute pressure PBA to the ECU 5.

An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature sensor (TW) sensor 10, which may be formed of a thermistor or the like, is mounted in the coolant-filled cylinder block of the engine for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A spark plug 13 for each cylinder of the engine 1 is electrically connected to the ECU 5 to have ignition timing thereof controlled by a signal supplied therefrom.

An exhaust pipe 14 extends from the cylinder block of the engine, in which an adsorber 15, a first catalytic converter 16, and a second catalytic converter are arranged in the mentioned order.

The adsorber 15, which contains an adsorbent, such as zeolite, adsorbs unburnt components (HC, etc.) contained in exhaust gases when the exhaust gas temperature is low, and releases unburnt components adsorbed therein when the exhaust gas temperature exceeds a predetermined temperature (approximately 200° C.), which are delivered to the first and second catalytic converters 16, 17.

The first catalytic converter 16 is comprised of a three-way catalyst 18 and a heater 19, and has its operation controlled by a signal from the ECU 5. More specifically, the heater 19 is operated only when the engine is started in a cold state, unless the temperature is extremely low (e.g. lower than −20° C.) or the battery voltage is not sufficiently high, and controlled for prompt activation of the first catalytic converter 16. This makes it possible to purify the exhaust gas when the engine temperature is low, thereby enhancing exhaust emission characteristics of the engine under such a cold condition.

Further, the first catalytic converter 16 has a catalyst bed temperature (TE) sensor 20 mounted thereon. The TE sensor 20 is electrically connected to the ECU 5 to supply a signal indicative of the sensed catalyst bed temperature TE to the ECU 5.

The second catalytic converter 17 is comprised of a three-way catalyst larger in capacity than the first catalytic converter 16, and noxious components contained in exhaust gases, such as HC, CO, and NOx, are purified mainly by the second catalytic converter, after the engine has been warmed up.

Further, the exhaust pipe 14 is provided with a bypass passage 21 bypassing the adsorber 15, and a flow path-changeover valve 22 is arranged in the exhaust pipe 13 at a branching portion at an upstream end of the bypass passage 21. The flow path-changeover valve 22 is electrically connected to the ECU 5, and controlled such that once the catalyst bed temperature TE detected by the TE sensor 20 has reached a predetermined temperature, indicating that the first catalytic converter 16 has been activated, the exhaust gases from the engine 1 are guided via the bypass passage 21 to the first catalytic converter 16. This makes it possible to prevent the life of the adsorber from being shortened through exposure to high-temperature exhaust gases after the engine has been warmed up.

Further, an oxygen concentration sensor (hereinafter referred to as "the $O_2$" sensor) 23 is arranged in the exhaust pipe 13 at a location upstream of the adsorber 15. The $O_2$ sensor 23 delivers a signal to the ECU 5, which goes high when the air-fuel ratio of a mixture supplied to the engine is rich, and low when it is lean.

The ECU 5 is comprised of an input circuit 5a having the functions of shaping the waveforms of input signals from various sensors mentioned above, shifting the voltage levels of sensor output signals to a predetermined level, converting analog signals from analog-output sensors to digital signals, and so forth, a central processing unit (hereinafter referred to as the "CPU") 5b, memory means 5c formed of a ROM storing various operational programs which are executed by the CPU 5b, and various maps, referred to hereinafter, and a RAM for storing results of calculations therefrom, etc. and an output circuit 5d which outputs driving signals to the fuel injection valves 6, the heater 19, the flow path-changeover valve 22, the spark plugs 13, and so forth.

The CPU 5 determines, based on the signals indicative of the above-mentioned parameters, various engine operating conditions, such as feedback control regions in which the engine is controlled in response to the concentration of oxygen contained in the exhaust gases, and open-loop control regions, and calculates a fuel injection period TOUT over which the fuel injection valves 6 are to be opened in synchronism with the TDC pulses, by the use of the following equation:

$$Tout = Ti \times KO2 K1 + K2 \qquad (1)$$

where Ti represents a basic fuel injection period which is determined based on the engine rotational speed NE and the intake pipe absolute pressure PBA. The memory means 5c stores a Ti map used in determining a value of the basic fuel injection period Ti.

KO2 represents an air-fuel ratio correction coefficient which is calculated based the output from the $O_2$ sensor 23 during the air-fuel ratio feedback control such that the air-fuel ratio (corresponding to the oxygen concentration) detected by the $O_2$ sensor 23 becomes equal to a desired air-fuel ratio, and set to predetermined values dependent on operating conditions of the engine during the open-loop control.

K1 and K2 represent other correction coefficients and correction variables, respectively, and are set to optimal values for engine operating characteristics, such as fuel consumption and accelerability, depending on operating conditions of the engine.

Further, the CPU 5b determines an ignition timing advance value θ IG for ignition timing control of the engine, based on signals indicative of engine operating parameters stated above, by the use of the following equation (2):

$$\theta IG = \theta IGMAP - \theta IGWUR \qquad (2)$$

where θ IGMAP represents a basic ignition timing advance value, which is determined by retrieving a basic ignition timing map, not shown, which is stored in the memory means 5c and set such that θ IGMAP values correspond to predetermined values of the engine rotational speed NS and ones of the intake pipe absolute pressure PBA indicative of load on the engine. θ IGWUR represents a retarding correction value which is set, as will be described in detail hereinafter, to predetermined values depending on operating conditions of the engine.

The ECU 5 (more specifically, CPU 5b) includes ignition timing-retarding means for effecting a retarding correction of the ignition timing when the engine temperature is low at the start of the engine, operation-detecting means for detecting whether or not the heater 19 of the first catalytic converter 16 is in operation, and retarding correction-restraining means for restraining the retarding correction of the ignition timing by the ignition timing-retarding means.

Figure 2:
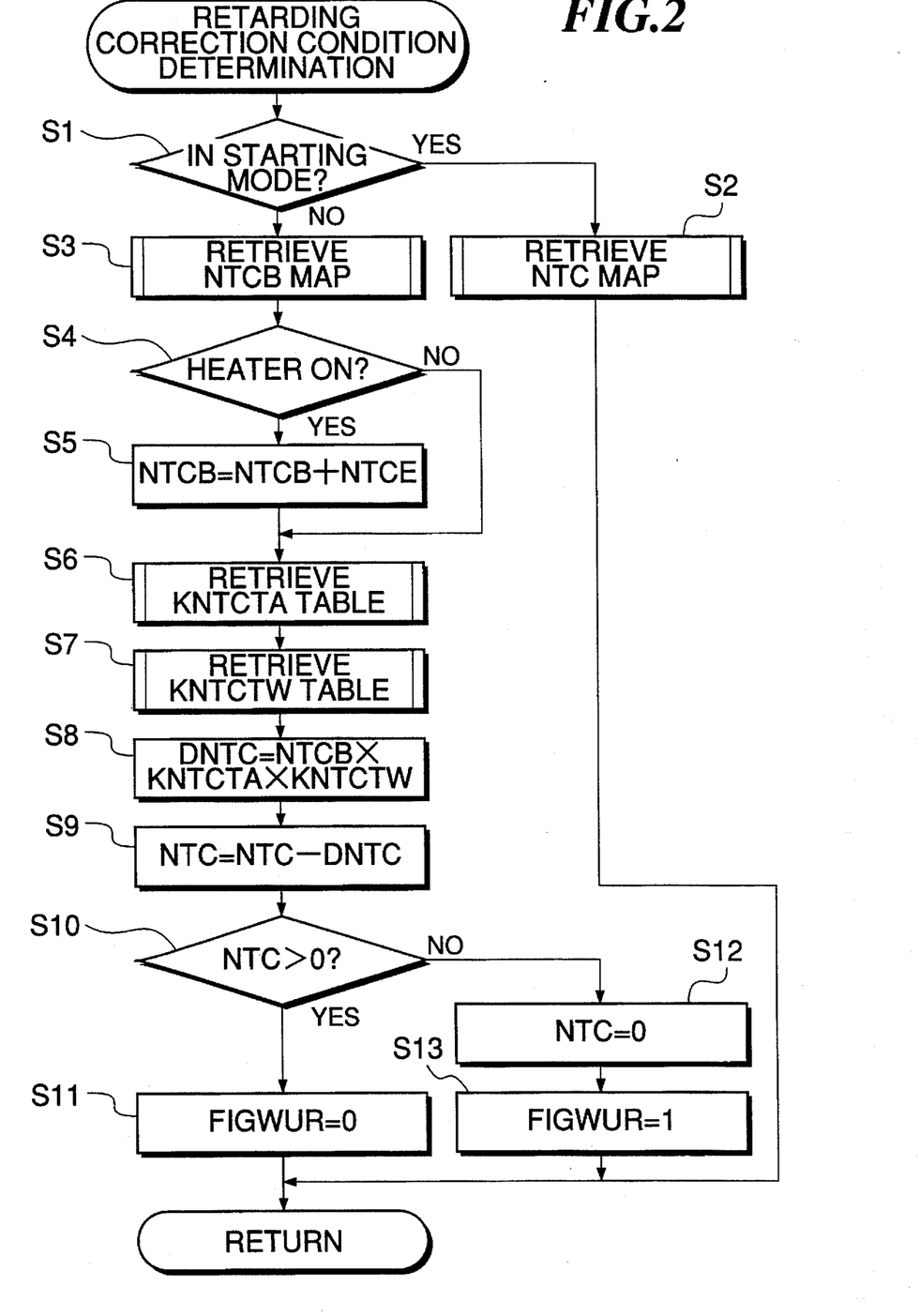
FIG. 2 is a flowchart showing a program for determining whether or not ignition timing retardation should be carried out.

FIG. 2 shows an ignition timing retarding condition-determining routine for determining whether the ignition timing retardation should be carried out at the start of the engine. This program is executed by a timer incorporated in the ECU 5, in synchronism with false signal pulses generated e.g. at intervals of 100 ms.

First, at a step S1, it is determined whether or not the engine is in starting mode. This determination is effected by determining whether a starter switch, not shown, of the engine is ON, and at the same time the engine rotational speed is lower than a predetermined value (cranking speed) to be assumed when the engine enters a self-sustaining state at the start of the engine. If it is determined that the engine is in the starting mode, the program proceeds to a step S2, where an NTC map is retrieved to calculate a predetermined time period NTC, followed by terminating the program. The NTC map provides map values of the predetermined time period NTC which is required for the first catalytic converter 16 to be warmed up to a predetermined temperature (e.g. 200° C.) at which it is activated after the start of the engine, assuming that the engine is in a low load operating condition.

Figure 3:
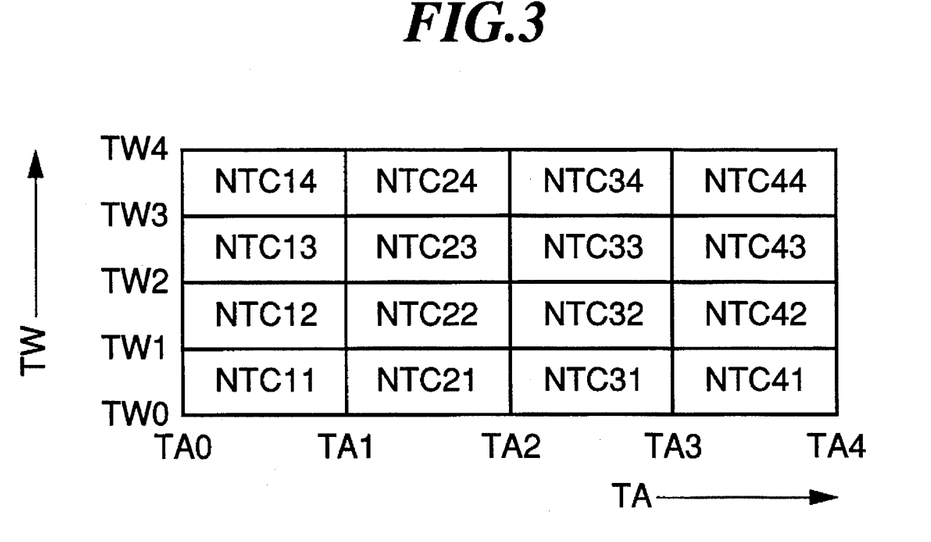
FIG. 3 shows an NTC map.

The NTC map is set in the form of a matrix, e.g. as shown in FIG. 3, such that map values NTC11 to NTC44 correspond to predetermined values TA0 to TA4 of the engine coolant temperature and predetermined values TW0 to TW4 of the intake air temperature. The predetermined time period NTC is determined by reading out from the NTC map or by interpolation of retrieved values. Thus, the predetermined time period NTC required for the first catalytic converter 16 to be warmed up to the predetermined temperature at which it becomes activated is calculated based on the engine coolant temperature TW and the intake air temperature TA assumed at the start of the engine.

If in a subsequent loop the answer to the question of the step S1 becomes negative (NO), the program proceeds to a step S3, where an NTCB map is retrieved to determine a time period NTCB corresponding to a degree of contribution of heat of the exhaust gases to warming-up of the first catalytic converter 16 to the predetermined temperature, which degree varies with operating conditions of the engine.

Figure 4:
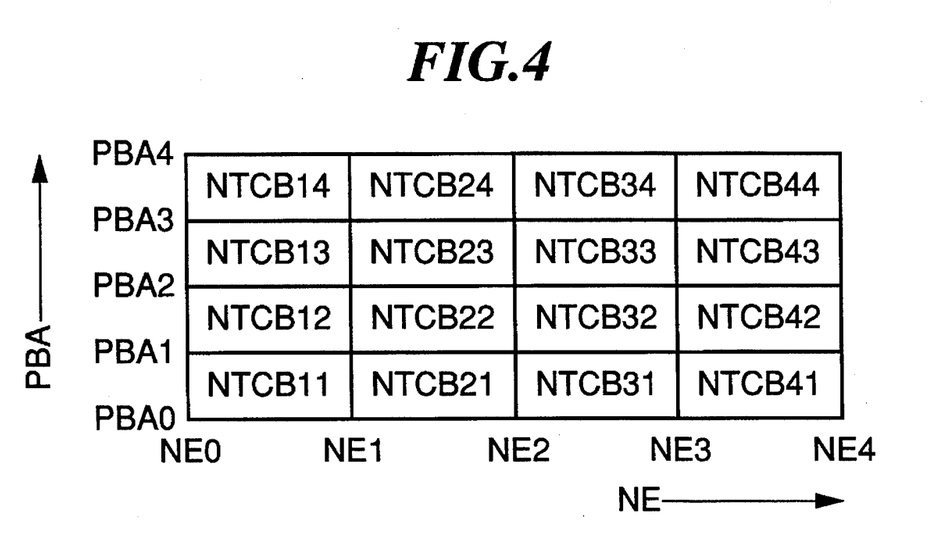
FIG. 4 shows an NTCB map.

The NTCB map is set e.g. in the form of a matrix as shown in FIG. 4, such that map values NTCB11 to NTCB44 correspond to predetermined values NE0 to TA4 of the engine rotational speed and predetermined values PBA0 to PBA4 of the intake pipe absolute pressure. The time period NTCB is determined by reading out from the NTC map or by interpolation of retrieved values. The time period NTCB is held at a fixed value NTCBFC when the fuel supply is cut off (i.e. at fuel cut).

Then, at a step S4, it is determined whether or not the heater 19 of the first catalytic converter 16 is in operation. As stated hereinabove, the heater 19 has its operation controlled by the ECU such that it is operated only when the engine is started in a cold state, unless the temperature of the same is extremely low (e.g. lower than −20° C.), or the battery voltage is lower than a predetermined value. When the temperature of the engine (specifically, the catalyst bed temperature TE) exceeds a predetermined value, the operation thereof is inhibited for economy of electric power.

If the answer to the question of the step S4 is negative (NO), i.e. if the heater 19 is not in operation, the program proceeds to a step S6, whereas if the answer is affirmative (YES), the program proceeds to a step S5, where a time period NTCE corresponding to a degree of contribution of heat generated by the heater 19 to warming-up of the temperature of the first catalytic converter 16 to the predetermined temperature for activation is added to the time period NTCB, by the use of the following equation (3):

$$NTCB = NTCB + NTCE \tag{3}$$

The time period NTCE is set to a predetermined value dependent on the capacity of the heater 19. Thus, the time period NTCB is calculated by addition of a time period ascribed to elevation of the temperature of the exhaust gases and a time period ascribed to heat generated by the heater.

Then, at a step S6, a KNTCTA table is retrieved to determine an intake air temperature-dependent correction coefficient KNTCTA for correcting the time period NTCB.

Figure 5:
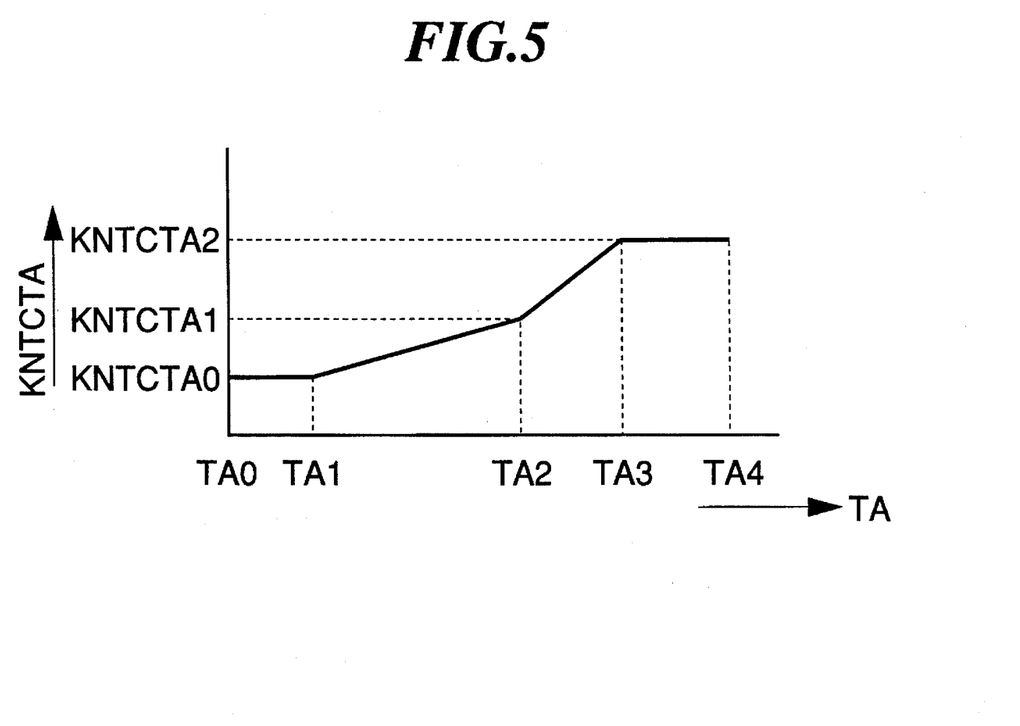
FIG. 5 shows a KNTCTA table.

The KNTCTA table is set e.g. as shown in FIG. 5, such that table values KNTCTA0 to KNTCTA2 correspond to predetermined values TA0 to TA4 of the intake air temperature. The intake air temperature-dependent correction coefficient KNTCTA is determined by reading out from the KNTCTA table or by interpolation of retrieved values. As is clear from FIG. 5, the intake air temperature-dependent correction coefficient KNTCTA is set to a larger value as the intake air temperature TA is higher.

Then, at a step S7, a KNTCTW table is retrieved to determine an engine coolant temperature-dependent correction coefficient KNCTW.

Figure 6:
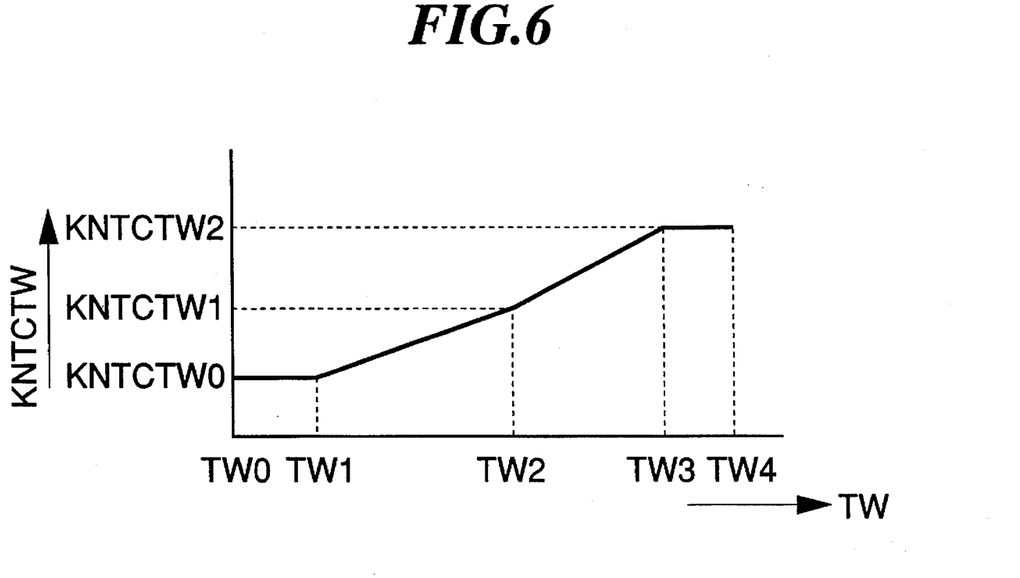
FIG. 6 shows a KNTCTW table.

The KNTCTW table is set e.g. as shown in FIG. 6, such that table values KNTCTW0 to KNTCTW2 correspond to predetermined values TW0 to TW4 of the engine coolant temperature. The engine coolant temperature-dependent correction coefficient KNTCTAW is determined by reading out from the KNTCTW table or by interpolation of retrieved value. As is clear from FIG. 6, the engine coolant temperature-dependent correction coefficient KNTCTW is set to a larger values as the engine coolant temperature TW is higher, similarly to the intake air temperature-dependent correction coefficient KNTCTA.

Then, the program proceeds to a step S8, where a time period DNTC is calculated by effecting intake air temperature-dependent correction and engine coolant temperature-dependent correction of the time period NTCB, by the use of the following equation (4):

$$DNTC = NTCB \times KNTCTA \times KNTCTW \tag{4}$$

As stated above, the correction coefficients KNTCTA and KNTCTW are set to larger values as the intake air temperature TA and the engine coolant temperature are higher, respectively, so that the time period DNTC assumes a larger value as the intake air temperature TA and the engine coolant temperature TW are higher.

Then, the program proceeds to a step S9, where the time period DNTC is subtracted from the predetermined time period NTC, to obtain a corrected value of the predetermined time period NTC, followed by the program proceeding to a step S10.

Figure 7:
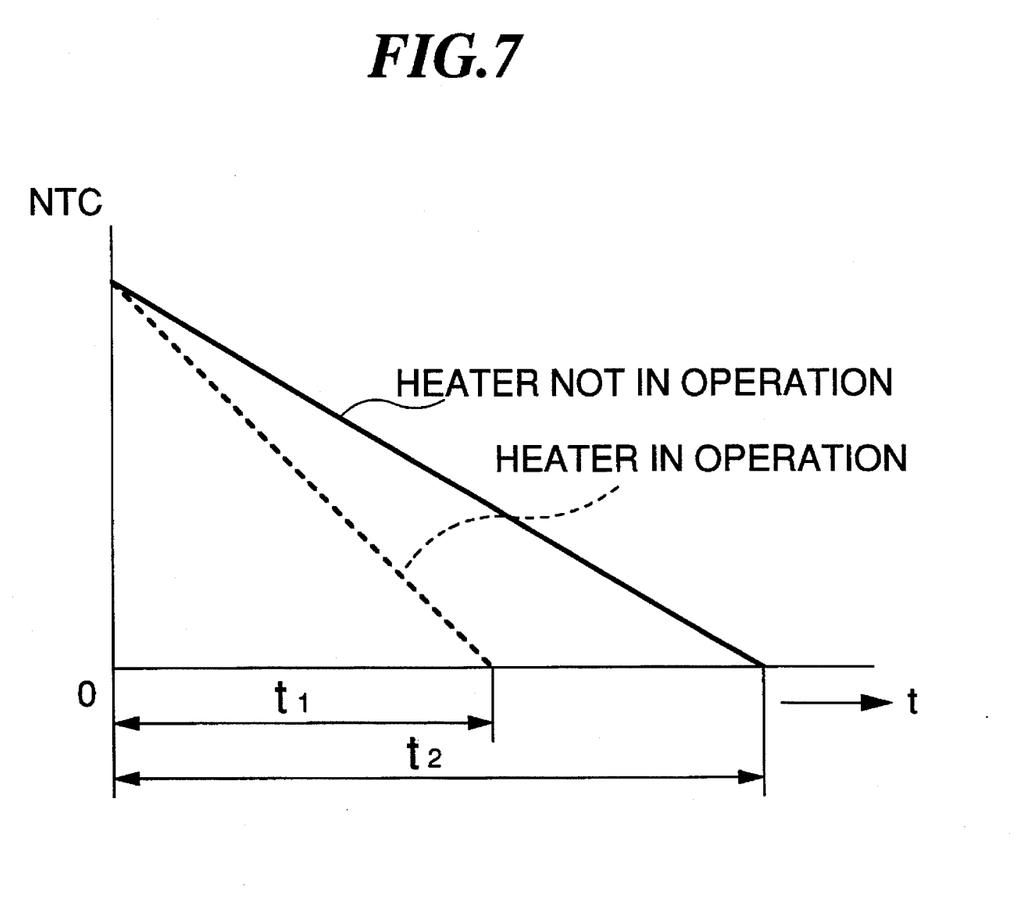
FIG. 7 is a diagram showing the relationship between a predetermined time period NTC calculated and a time period t elapsed after the start of the engine.

FIG. 7 shows the relationship between the predetermined time period NTC calculated at each time point immediately after the start of the engine, and a time period t having elapsed after the start of the engine, in which the solid line represents an NTC value in the case where the heater 9 is not in operation, while the broken line represents an NTC value in the case where the heater 9 is in operation. Time periods $t_1$ and $t_2$ correspond to time periods during which the ignition timing retardation is required to be restrained, when the heater is in operation, and when it is not in operation, respectively.

Since the time period DNTC increases with the lapse of time t, the predetermined time period NTC decreases with the lapse of time t, and a rate of decrease in the time period NTC is larger when the heater is in operation than when it is not in operation.

Then, at a step S10, it is determined whether or not the predetermined time period NTC is larger than "0". If the answer to this question is affirmative (YES), a flag FIGWUR is set to "0" to restrain the ignition timing retardation at a step S11, followed by terminating the program. That is, to secure adsorption capability of the adsorber 15, the catalysts are activated only by heat of the exhaust gases elevated in temperature and heat generated by the heater 19. The inhibition of the ignition timing retardation prevents the exhaust gas temperature from excessively rising, which ensures that the first catalytic converter 16 is warmed up at a sufficient rate, while securing the adsorption capability of the adsorber 15 to the maximum.

On the other hand, if the answer to the question of the step S10 is negative (NO), i.e. if an increase in the time period DNTC causes the predetermined time period NTC to be equal to or lower than "0", it is judged that the first catalytic converter 16 has been sufficiently activated to purify the unburnt components released from the adsorber 15. Accordingly, the predetermined time period NTC is reset to "0" at a step S12, and the flag FIGWUR is set to "1" for permitting ignition timing retardation at a step S13, followed by terminating the program. This makes it possible to accelerate the warming-up of the engine by heat of the exhaust gases elevated in temperature by the ignition timing retardation, even after the heater 19 ceases to operate, until the second catalytic converter 17 becomes sufficiently activated to properly purify the exhaust gases.

Figure 8:
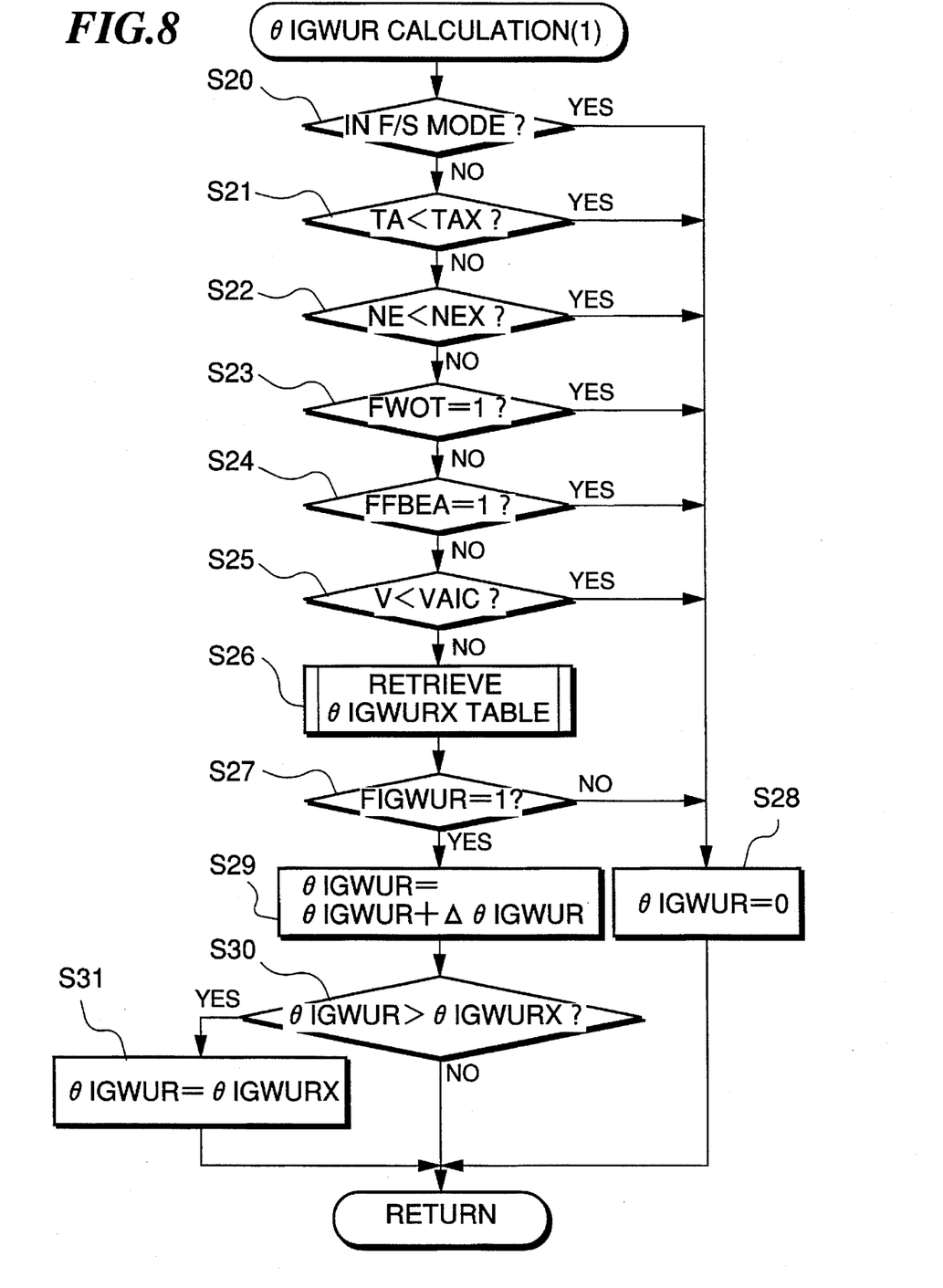
FIG. 8 is a flowchart showing a θ IGWUR-calculating routine for calculating a retarding correction value θ IGWUR.

FIG. 8 shows a θ IGWUR-calculating routine for calculating θ IGWUR for use in ignition timing retardation. The program is executed in synchronism with generation of each TDC signal pulse.

First, at a step S20, it is determined whether or not there is a failure in any of the sensors referred to above, i.e. whether or not the engine is in a fail-safe mode. If the answer to this question is negative (NO), the program proceeds to a step S21, where it is determined whether or not the exhaust air temperature TA is lower than a predetermined value TAX (e.g. 20° C.). If the answer to this question is negative (NO), i.e. if the intake air temperature TA is equal to or higher than the predetermined value TAX, the program proceeds to a step S22, where it is determined whether or not the engine rotational speed NE is equal to or lower than a predetermined value NEX (e.g. 1000 rpm). If the answer to this question is negative (NO), i.e. if the engine rotational speed NE is higher than the predetermined value NEX, the program proceeds to a step S23, where it is determined whether or not a flag FWOT is equal to "1" to determine whether the engine is in a predetermined high load condition. This determination is effected by determining whether the opening θ TH of the throttle valve 3' is substantially fully open. If the answer to this question is negative (NO), i.e. if the engine is not in the predetermined high load condition, in other words, if the flag FWOT is equal to "0", the program proceeds to a step S24, where it is determined whether or not a flag FFBEA is equal to "1" to determine whether or not an idling intake air control device ("hereinafter referred to as "the EACV"), not shown, is in a feedback mode. The EACV is comprised of a bypass passage bypassing the throttle valve 3', and a control valve arranged in the bypass passage for controlling an amount of auxiliary air supplied to the engine 1, and feedback-controls the amount of auxiliary air such that the actual value of the engine rotational speed NE becomes equal to a desired value. When the engine is in a predetermined operating condition, the flag FFBEA is set to "1" to set the EACV into the feedback mode. If the flag FFBEA is equal to "0", i.e. if the EACV is not in the feedback mode, the program proceeds to a step S25, where it is determined whether or not the vehicle speed V is lower than a predetermined value VAIC (e.g. 3 km/h). If the answer to this question is negative (NO), the program proceeds to a step S26, where a θ IGWURX table is retrieved to determine a limit retardation value θ IGWURX for setting a limit to ignition timing retardation.

Figures 9A, 9B:
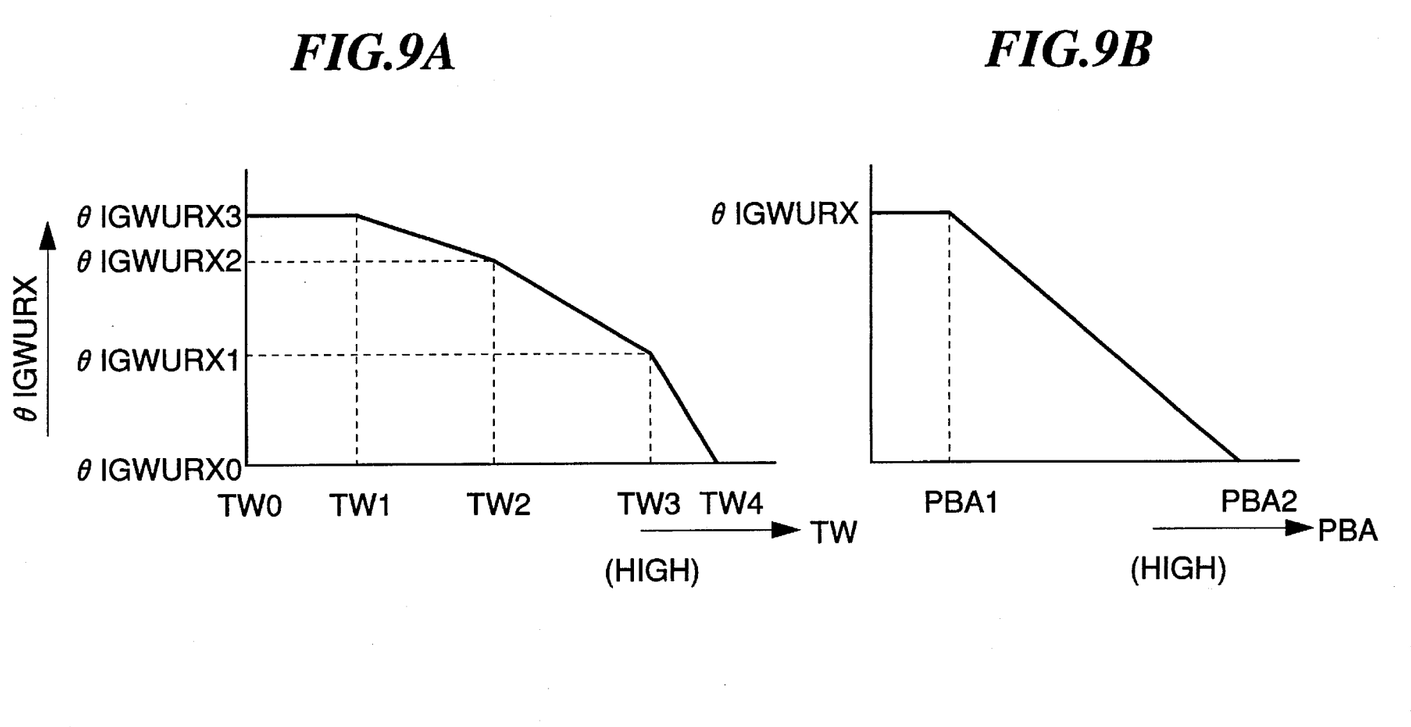
FIG. 9A shows a coolant temperature table constituting a θ IGWURX table.
FIG. 9B is a PBA-dependent correction table constituting the θ IGWURX table.

The θ IGWURX table is formed e.g. by a coolant temperature table shown in FIG. 9A and a PBA-dependent correction table shown in FIG. 9B. The limit retardation value θ IGWURX is determined by interpolating values retrieved from the coolant temperature table, by the use of the PBA-dependent correction table. More specifically, the coolant temperature table is set such that table values θ IGWURX0 to θ IGWURX3 of the limit retardation value correspond to predetermined values TW0 to TW4 of the engine coolant temperature. A basic limit retardation value (table value) determined through retrieval of the coolant table is interpolated between predetermined values PBA1 and PBA2, by the use of the PBA-dependent correction table of FIG. 9B, to obtain a value of the limit retardation value θ IGWURX corrected for the intake pipe absolute pressure. The retrieval of the θ IGWURX table is executed by background processing.

Then, at a step S27, it is determined whether or not the flag FIGWUR is equal to "1", i.e. whether it has been set to "1" by the FIG. 2 program. If the answer to this question is negative (NO), i.e. if the flag FIGWUR is equal to "0", the retarding correction value θ IGWUR is set to "0" at a step S28, followed by terminating the program.

On the other hand, if the answer to the question of the step S27 is affirmative (YES), the present value of the retarding correction value θ IGWUR is updated by adding a very small incremental value Δθ IGWUR to a value of the θ IGWUR obtained in the preceding loop. Then, at steps S30 et seq., a limit check of the retarding correction value θ IGWUR is performed. More specifically, it is determined at the step S30 whether or not the retarding correction value θ IGWUR is larger than the limit retardation value θ IGWURX calculated at the step S26. If the answer to this question is negative (NO), the program is immediately terminated, while if the answer is affirmative (YES), the program proceeds to a step S31, where the retarding correction value θ IGWUR is set to the limit retardation value θ IGWURX, followed by terminating the program. Then, the ignition timing advance value θ IG is determined based on the retarding correction value θ IGWUR thus calculated by the use of the equation (2) described hereinabove.

If any of the answers to the questions of the steps S20 to S25 is affirmative (YES), the retarding correction value θ IGWUR is set to "0", followed by terminating the program. That is, the affirmative answer (YES) to the question of the step S20 means failure of a sensor for determining a parameter used in the program, which prevents accurate ignition timing control, and hence the ignition timing retardation is inhibited. Further, the affirmative answers (YES) to the questions of the steps S21 and S22 mean that the intake air temperature TA and the engine rotational speed NE are extremely low, respectively, so that in either of these cases, the ignition timing retardation is inhibited to prevent engine stalling. If the answer to the question of the step S23 is affirmative (YES), i.e. if the engine is in the predetermined high load condition, the ignition timing retardation is inhibited to prevent degradation of performance of engine, such as insufficient engine torque. If the answer to the question of the step S24 is affirmative (YES), i.e. if the EACV is executing the feedback control, as well, unnecessary ignition timing retardation is inhibited to secure a stable performance of the engine at idle. Further, if the answer to the question of the step S25 is affirmative (YES), i.e. if a vehicle on which the engine is installed is traveling at a low speed, as well, the ignition timing retardation is inhibited to prevent engine stalling.

Figure 10:
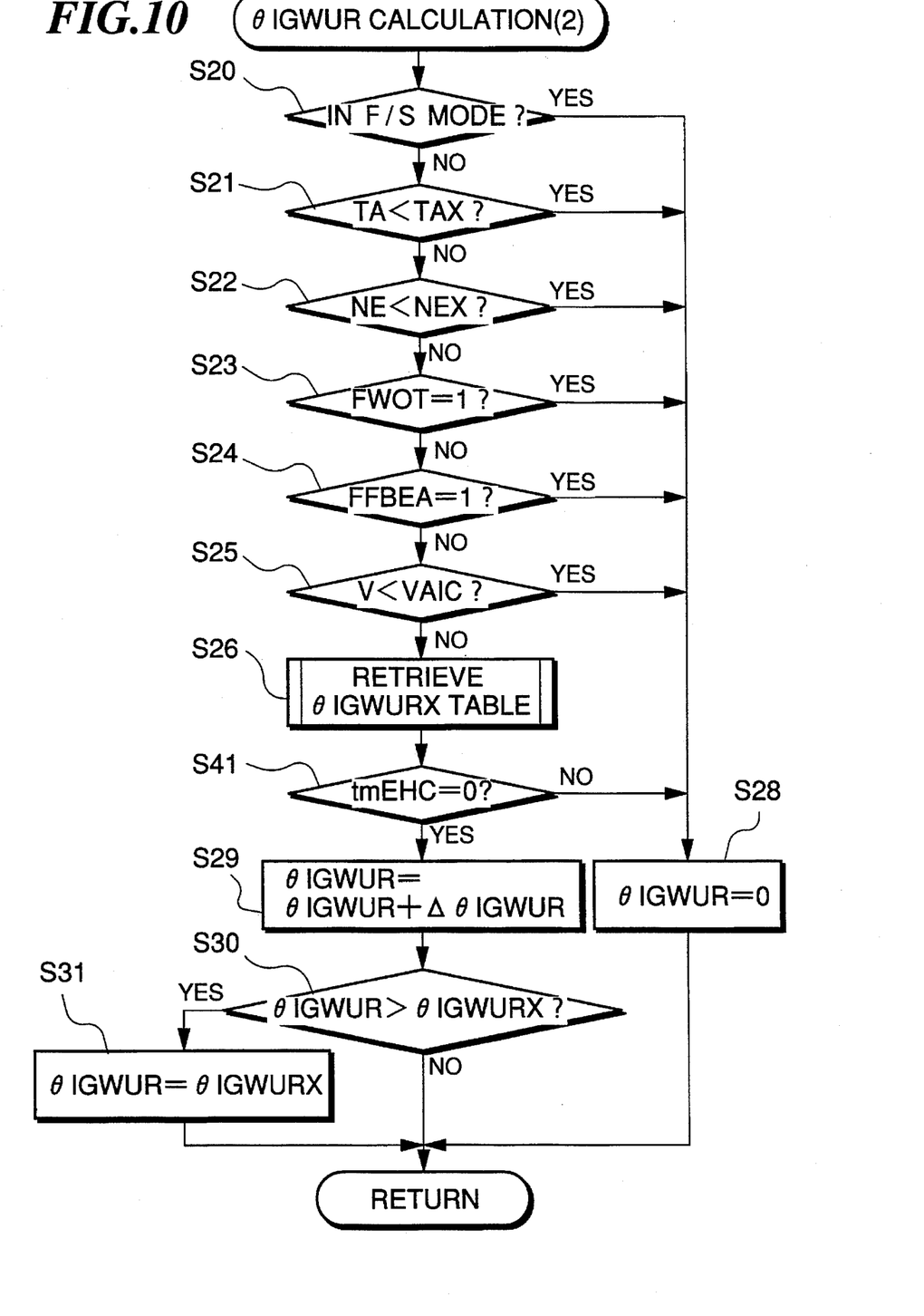
FIG. 10 is a flowchart showing a θ IGWUR-calculating routine for calculating a retarding correction value θ IGWUR, according to the second embodiment of the invention.

FIG. 10 shows a θ IGWUR-calculating routine according to a second embodiment of the invention. The second embodiment is distinguished from the first embodiment described above, in which a determination as to whether or not the ignition timing retardation should be inhibited is executed at the step S27, based on the status of the flag FIGWUR, in that it is determined at a step S41, in place of the step S27 of the corresponding routine of the first embodiment, whether or not a predetermined timer period tmEHC to which is set a timer formed by a down counter has been counted up, and when it has been counted up, i.e. when tmEHC=0, the ignition timing retardation is carried out at a step S29, and at a step S30, a limit check of the retarding correction value θ IGWUR is carried out. On the other hand, if tmEHC is not equal to 0, it is judged that the first catalytic converter 16 has not been activated, and the program proceeds to a step S28, where the retarding correction value θ IGWUR is set to "0" to inhibit the retardation of the ignition timing, and thereby activate the catalyst of the first catalytic converter 16 by heat generated by the heater 19.

Figure 11:
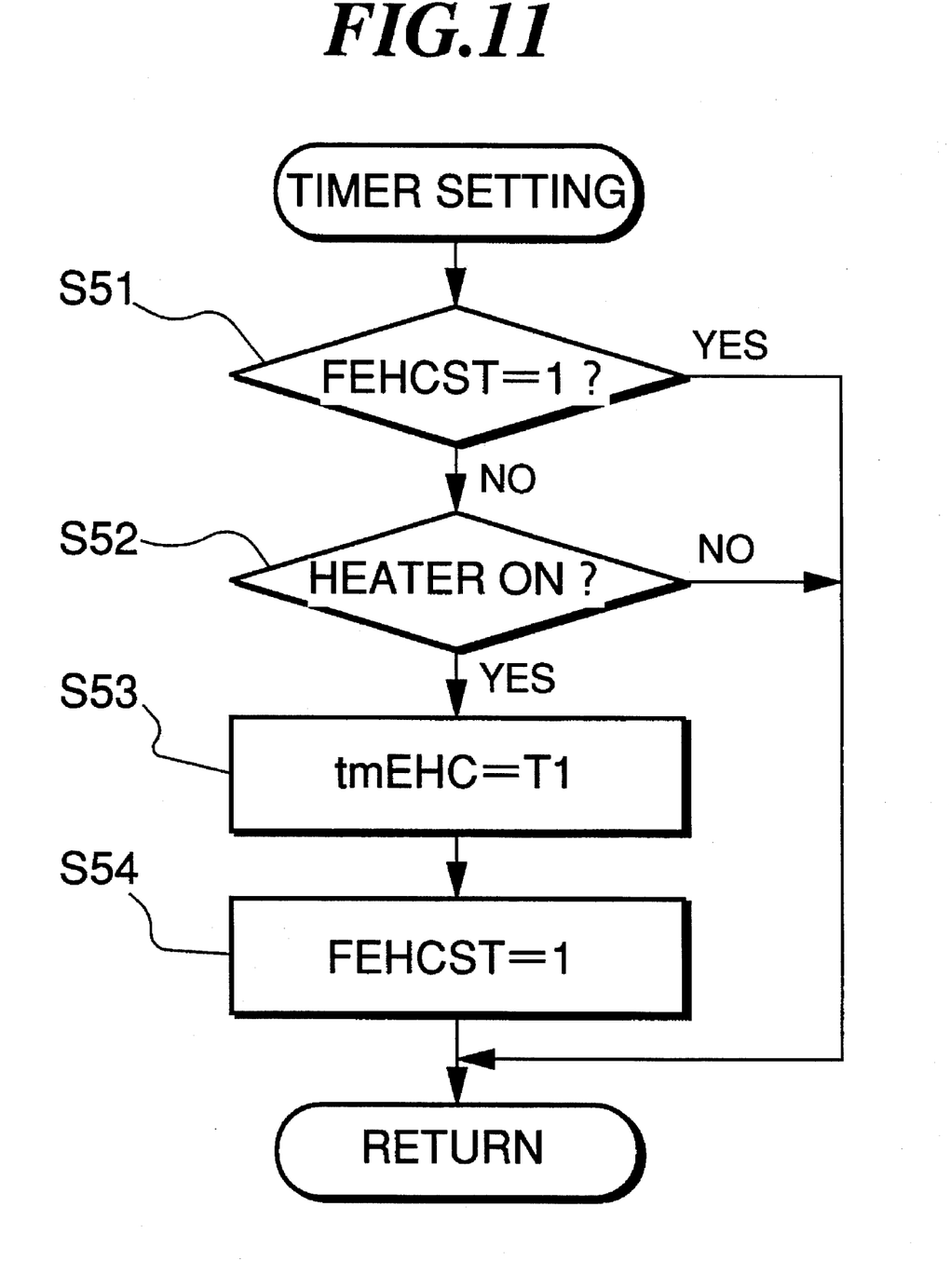
FIG. 11 is a flowchart showing a timer-setting routine executed according to the second embodiment.

The timer value tmECH is set by executing a timer-setting routine shown in FIG. 11 by background processing.

That is, at a step S51 of the FIG. 11 routine, it is determined whether or not a flag FEHCST is equal to "1" to judge therefrom whether or not the timer has been started. When this step is executed for the first time, the timer has not been started yet, and hence the answer to this question is negative (NO). The program then proceeds to a step S52, where it is determined whether or not the heater 19 is in operation. If the heater 19 is in operation, the timer value tmEHC is set to a predetermined value T1. The predetermined value T1 corresponds to a time period required to elapse after the start of the engine and before the first catalytic converter 15 is activated. The predetermined value T1 may be varied according to the engine coolant temperature TW and the intake air temperature TA. Then, at a step S54, the flag FEHCST is set to "1" to indicate that the timer has been started, followed by terminating the program.

Once the flag FEHCST has been set to "1", the answer to the question of the step S51 becomes affirmative (YES), and continues to be affirmative until the timer counts up the timer value tmEHC, followed by immediately terminating the program. Further, if the heater 19 is not in operation, and accordingly, the answer to the question of the step S52 is negative (NO), this normally means that the engine has been warmed up, which makes it unnecessary to inhibit the ignition timing retardation at a low temperature. Therefore, the program is terminated without starting the timer.

As described above, according to the second embodiment, the ignition timing retardation is inhibited until the timer counts up the timer value tmEHC. Further, the timer is started only when the heater 19 is in operation, and hence the ignition timing retardation is normally inhibited when the heater is in operation, thereby accelerating activation of the first catalytic converter 16 only by heat generated by the heater 19 without excessively elevating the temperature of the exhaust gases.

Figure 12:
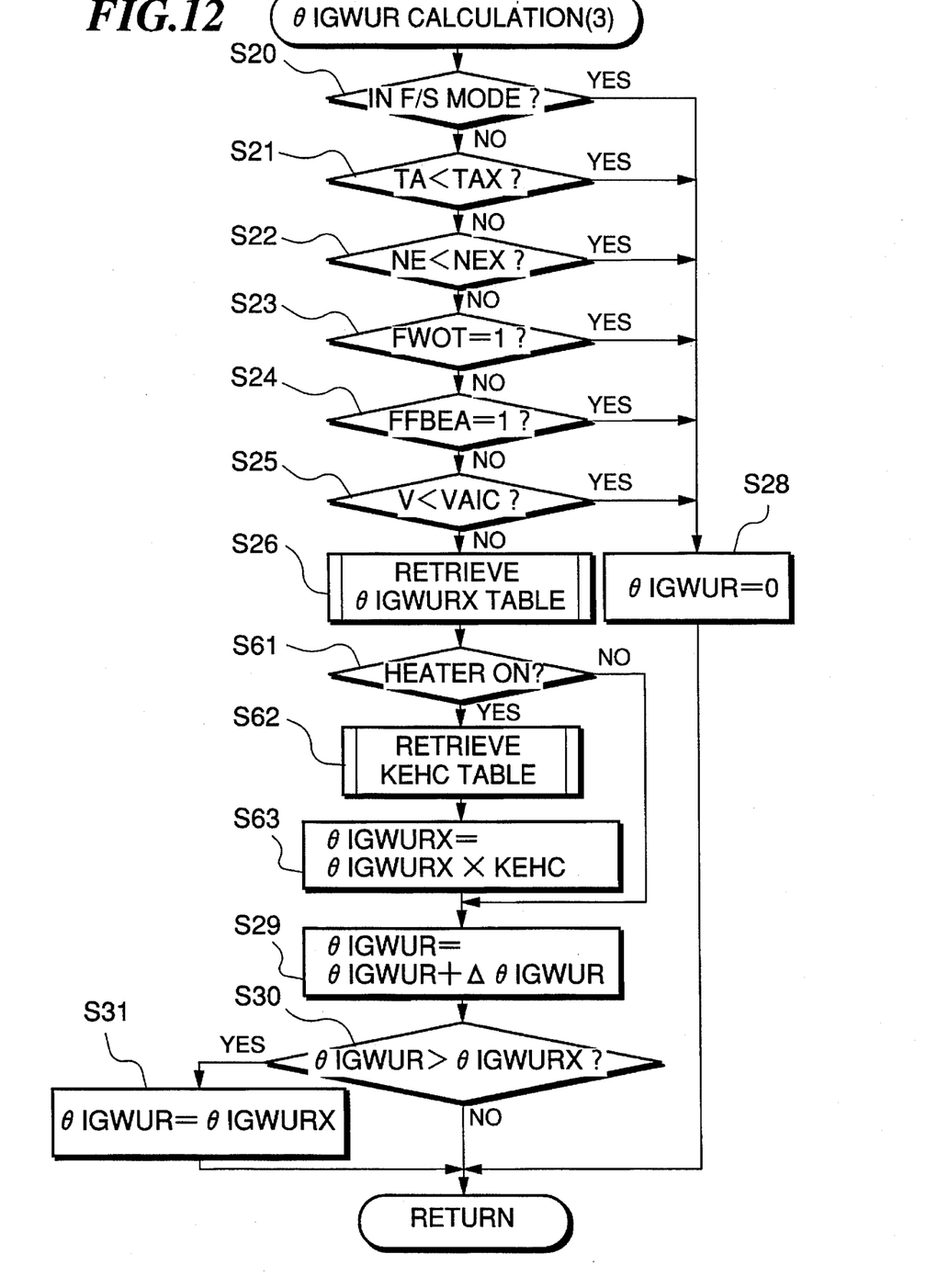
FIG. 12 is a flowchart showing a θ IGWUR-calculating routine for calculating a retarding correction value θ IGWUR, according to the third embodiment of the invention.

FIG. 12 shows a θ IGWUR-calculating routine according to a third embodiment of the invention. This embodiment is distinguished from the first and second embodiments in which whether or not the ignition timing retardation should be inhibited is determined from the status of the flag FIGWUR or from the timer value tmEHC, in that the limit retardation value θ IGWURX is controlled at a low temperature TE, to thereby control the retarding correction value θ IGWUR.

More specifically, at a step S61 of the FIG. 12 routine, it is determined whether or not the heater 19 of the first catalytic converter 16 is in operation. If the answer to this question is affirmative (YES), a KEHC table is retrieved at a step S62 to determine a retarding correction-restraining value KEHC.

Figure 13:
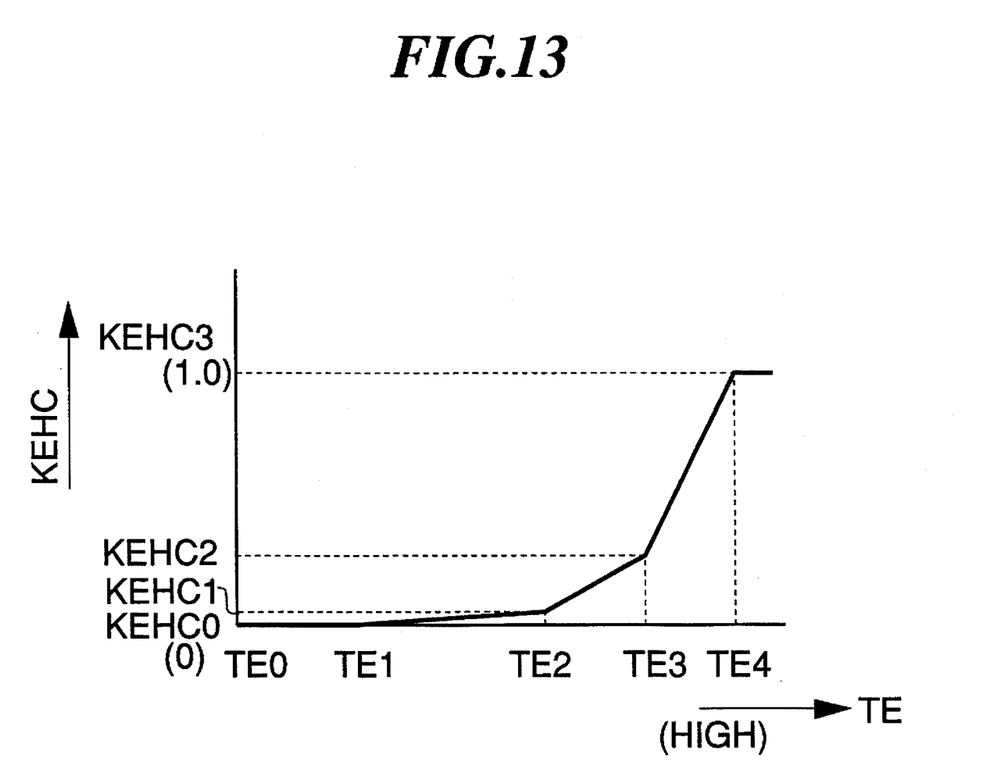
FIG. 13 shows a KEHC table.

The KEHC table is set, e.g. as shown in FIG. 13, such that table values KEHC0 to KEHC3 correspond to predetermined values TE0 to TE4 of the catalyst bed temperature TE (detected by the TE sensor 20) of the first catalytic converter 16. The retarding correction-restraining value KEHC is determined by reading out from the KEHC table or by interpolation of retrieved values. As is clear from FIG. 13, the retarding correction-restraining value KEHC is set between 0 to 1.0. That is, when the catalyst bed temperature TE of the first catalytic converter 16 is low and hence the catalyst has not been activated, the value KEHC is set to a value smaller than 1.0. As a result, the limit retardation value θ IGWURX is set to a small value. As the catalyst bed temperature TE of the first catalytic converter 16 becomes higher, the value KEHC is increased toward 1.0, thereby relaxing the restraint of the limit retardation value θ IGWURX.

At a step S63, the limit retardation value θ IGWURX is multiplied by the value KEHC (≦1.0) to obtain a corrected value of the limit retardation value θ IGWURX. That is, since the value KEHC is set to a value smaller than 1.0 when the catalyst bed temperature TE of the first catalytic converter 16 is low, the limit retardation value θ IGWURX is set to a small value to restrict the retarding correction value. On the other hand, if the catalyst bed temperature TE becomes higher than the predetermined value TE4, the value KEHC is set to 1.0, so that the program proceeds to the step S29 without restricting the retarding correction value. If the answer to the question of the step S61 is negative (NO), the steps S29 et seq. are executed.

As described above, according to the third embodiment, the limit retardation value θ IGWURX is restricted according to the retarding correction-restraining value KEHC to decrease the ignition timing retardation value θ IGWUR. As a result, it is possible to elevate the temperature of the first catalytic converter at a sufficient rate, while minimizing the effect of the ignition timing restraint upon the operation of the engine, similarly to the first and second embodiments.

What is claimed is:

1. In an ignition timing control system for an internal combustion engine having an exhaust passage, an adsorber arranged in said exhaust passage for adsorbing unburnt components in exhaust gases, and an exhaust gas-purifying device arranged in said exhaust passage at a location downstream of said adsorber, said exhaust gas-purifying device having heater means, the improvement comprising:

ignition timing-retarding means for retarding ignition timing of said engine when said engine is started in a cold state; and ignition timing retardation-restraining means for restraining retardation of the ignition timing by said ignition timing-retarding means over a time period from the start of said engine to a time point said exhaust gas-purifying device is warmed up to a predetermined activated condition.

2. An ignition timing control system according to claim 1, wherein said ignition timing retardation-restraining means inhibits said retardation of said ignition timing by said ignition timing-retarding means, over said time period from the start of said engine to said time point said exhaust gas-purifying device is warmed up to said predetermined activated condition.

3. An ignition timing control system according to claim 1, wherein said ignition timing retarding means retards the ignition timing by an ignition timing retarding amount, and said ignition timing retardation-restraining means restricts said ignition timing-retarding amount over said time period from the start of said engine to said time point said exhaust gas-purifying device is warmed up to said predetermined activated condition.

4. An ignition timing control system according to claim 2, including temperature-detecting means for detecting a temperature of said exhaust gas-purifying device, and wherein said predetermined activated condition is determined based on results of detection by said temperature-detecting means.

5. An ignition timing control system according to claim 3, including temperature-detecting means for detecting a temperature of said exhaust gas-purifying device, and wherein said predetermined activated condition is determined based on results of detection by said temperature-detecting means.

6. An ignition timing control system according to claim 5, wherein said ignition timing-retarding amount is determined based on said temperature of said exhaust gas-purifying device detected by said temperature-detecting means.

7. An ignition timing control system according to claim 2, including operating condition-detecting means for detecting operating conditions of said engine, and wherein said predetermined activated condition is determined based on results of detection by said operating condition-detecting means.

8. An ignition timing control system according to claim 3, including operating condition-detecting means for detecting operating conditions of said engine, and wherein said predetermined activated condition is determined based on results of detection by said operating condition-detecting means.

9. An ignition timing control system according to claim 2, wherein said time period from the start of said engine to said time point said exhaust gas-purifying device is warmed up to said predetermined activated condition is determined depending on an operative state of said heater means.

10. An ignition timing control system according to claim 3, wherein said time period from the start of said engine to said time point said exhaust gas-purifying device is warmed up to said predetermined activated condition is determined depending on an operative state of said heater means.

11. An ignition timing control system according to claim 2, including operating condition-detecting means for detecting operating conditions of said engine, and wherein said predetermined activated condition is determined based on results of detection by said operating condition-detecting means and depending on an operative state of said heater means.

12. An ignition timing control system according to claim 3, including operating condition-detecting means for detecting operating conditions of said engine, and wherein said predetermined activated condition is determined based on results of detection by said operating condition-detecting means and depending on an operative state of said heater means.

13. An ignition timing control system according to claim 11, wherein when said engine is in a starting mode, said ignition timing retardation-restraining means calculates said time period from the start of said engine to said time point said exhaust gas-purifying device is warmed up to said predetermined activated condition, based on said operating conditions of said engine detected by said operating condition-detecting means, and thereafter, calculates a sum of a first time period corresponding to a degree of contribution of heat of said exhaust gases to elevation of a temperature of said exhaust gas-purifying means and a second time period corresponding to a degree of contribution of heat generated by heater means to said elevation of said temperature of said exhaust gas-purifying means, to determine that said exhaust gas-purifying device is in said predetermined activated condition when the sum of said first time period and said second time period exceeds said time period from the start of said engine to said time point said exhaust gas-purifying device is warmed up to said predetermined activated condition calculated based on said operating conditions of said engine detected by said operating condition-detecting means.

14. An ignition timing control system according to claim 12, wherein when said engine is in a starting mode, said ignition timing retardation-restraining means calculates said time period from the start of said engine to said time point said exhaust gas-purifying device is warmed up to said predetermined activated condition, based on said operating conditions of said engine detected by said operating condition-detecting means, and thereafter, calculates a sum of a first time period corresponding to a degree of contribution of heat of said exhaust gases to elevation of a temperature of said exhaust gas-purifying means and a second time period corresponding to a degree of contribution of heat generated by heater means to said elevation of said temperature of said exhaust gas-purifying means, to determine that said exhaust gas-purifying device is in said predetermined activated condition when the sum of said first time period and said second time period exceeds said time period from the start of said engine to said time point said exhaust gas-purifying device is warmed up to said predetermined activated condition calculated based on said operating conditions of said engine detected by said operating condition-detecting means.

* * * * *